United States Patent [19]
Pfleger

[11] Patent Number: 4,987,992
[45] Date of Patent: Jan. 29, 1991

[54] MATERIAL TRANSFER APPARATUS
[75] Inventor: Robert H. Pfleger, Milwaukee, Wis.
[73] Assignee: Pflow Industries Inc., Milwaukee, Wis.
[21] Appl. No.: 294,349
[22] Filed: Jan. 9, 1989
[51] Int. Cl.$^5$ .............................................. B65G 47/53
[52] U.S. Cl. ................................... 198/475.1; 198/800
[58] Field of Search ............................... 198/475.1, 800

[56] References Cited

U.S. PATENT DOCUMENTS

| | | | |
|---|---|---|---|
| 931,570 | 8/1909 | Courtney | 198/800 X |
| 1,525,870 | 2/1925 | Lee | 198/800 X |
| 1,698,545 | 1/1929 | Hill | 198/475.1 |
| 3,515,257 | 6/1970 | Smith et al. | 198/475.1 X |
| 3,664,482 | 5/1972 | Kornylak | 198/20 |
| 4,002,231 | 1/1976 | Doty | 198/483 |
| 4,139,092 | 2/1979 | Yamano | 198/800 |
| 4,168,009 | 9/1979 | Ide | 198/475.1 X |
| 4,214,848 | 7/1980 | Verwey et al. | 198/475.1 X |
| 4,421,227 | 12/1983 | Kornylak | 198/800 |
| 4,450,951 | 5/1984 | Szanati | 198/475.1 X |
| 4,465,177 | 8/1984 | Dorner | 198/475.1 |
| 4,643,495 | 2/1987 | Pepping et al. | 198/800 X |

FOREIGN PATENT DOCUMENTS 1251694 10/1967 Fed. Rep. of Germany ... 198/475.1

Primary Examiner—H. Grant Skaggs
Assistant Examiner—James R. Bidwell
Attorney, Agent, or Firm—Andrus, Sceales, Starke & Sawall

[57] ABSTRACT

A material transfer apparatus for transferring articles between different vertical levels. The apparatus includes a pair of endless members, such as chains, mounted for travel in parallel generally rectangular paths, each including an upward vertical run, an upper horizontal run, a downward vertical run and a lower horizontal run. At least one carrier is mounted on the chains for free rotation about a horizontal axis and the carrier has a article supporting surface extending horizontally in cantilevered relation from the axis. Articles to be transferred are fed into the path of travel of the carrier by a first conveyer as the carrier moves in the upward vertical run and are elevated from the first conveyer and subsequently lowered by the carrier onto a second discharge conveyer for discharge as the carrier travels in the downward vertical run. Guide members on the carrier engage fixed guide tracks on the supporting structure to maintain the supporting surface in a horizontal attitude as the carrier moves in its path of travel.

8 Claims, 6 Drawing Sheets

MATERIAL TRANSFER APPARATUS

BACKGROUND OF THE INVENTION

In material handling systems, it is often desired to transfer articles from one vertical elevation to another, while in other systems it may be desired to elevate articles over an obstruction, such as an aisle, and then lower the article back to the original elevation on the other side of the obstruction.

It is known to utilize material handling systems that incorporate endless members, such as chains or cables, that are mounted for endless travel and to attach carriers or trays to the chain. In systems of this type, articles are introduced onto the carriers as the carriers move in an upward path and are subsequently discharged when the carriers are at a higher elevation in the upward path. However, problems have arisen in attempting to automatically discharge the articles as the carrier is moving upwardly. In U.S. Pat. No. 3,664,482 and 4,421,227, the carriers are formed with a plurality of spaced horizontal fingers which travel upwardly through spaces in a conveyor to lift an article from the conveyor. At an elevated position, the carrier is then tilted to a downwardly inclined position to enable the articles to slide from the carrier for discharge. However, systems of this type do not insure a positive discharge, for the articles, depending on their nature, may not fully slide from the carriers with the result that the articles may be carried around to the top of the conveying path and then dumped. As a further disadvantage, systems of this type are not versatile and can only discharge articles in a single direction, namely in the direction of tilt of the carrier.

SUMMARY OF THE INVENTION

The invention is directed to an improved high speed material transfer apparatus in which articles are picked from a conveyor or pick-up station while the carriers are moving in an upward path of travel and are deposited on a second conveyor or discharge station while the carriers are moving in a downward path. In accordance with the invention, the apparatus includes a frame or supporting structure and a pair of endless members, such as chains, are mounted for travel in parallel generally rectangular paths.

At least one carrier is mounted on the chains for free rotation about a horizontal axis and the carrier has an article supporting surface that is cantilevered horizontally from the axis. The carrier preferably is mounted to move in a path that consists of a first vertical run, an upper horizontal run, a second vertical run and a lower horizontal run.

Each article to be transferred is fed into the path of travel of the carrier by a first conveyor and is elevated from the first conveyor as the carrier moves upwardly in the first vertical run. Subsequently the article is lowered onto a second conveyor for discharge as the carrier moves downwardly in the second vertical run. Each conveyor is provided with parallel transverse gaps or interruptions and the carrier is formed with a series of parallel fingers which move through the gaps in the conveyors as the carrier moves in its path of travel.

The carrier is provided with a plurality of guide members, such as rollers, which are adapted to engage guide tracks on the supporting structure, and the guide members and tracks are constructed and arranged so that the supporting surface of the carrier is maintained in a horizontal attitude as the carrier moves throughout its entire path of travel.

The apparatus of the invention enables articles to be automatically and rapidly transferred from one location to another, preferably at different vertical elevations.

As the article supporting surface of the carrier is cantilevered outwardly from the drive chains, three-sided access is achieved for both feeding and discharge of the articles.

The apparatus is reversible so that articles can either be elevated from one location to another, or conversely, lowered from a first location to a second.

The carrier is freely rotatable on the chains and yet the carrier is maintained in the horizontal attitude throughout the entire path of travel of the carrier by virtue of the engagement of the guide members on the carrier with guide tracks on the supporting structure.

Other objects and advantages will appear in the course of the following description.

DESCRIPTION OF THE DRAWINGS

The drawings illustrate the best mode presently contemplated in carrying out the invention.

In the drawings.

DESCRIPTION OF THE ILLUSTRATED EMBODIMENT

FIGS. 1-5 illustrate an apparatus for transferring articles from one location to another and as illustrated, the articles are transferred between two different elevations.

The apparatus, in general, comprises a generally box shaped vertical frame or supporting structure 1 which houses a transfer unit 2. Articles 3 to be transferred are fed to the transfer unit 2 by an infeed conveyor 4 and articles are discharged from the transfer unit to a discharge conveyor 5 which is located at a higher elevation than the infeed conveyor 4.

Figure 1:
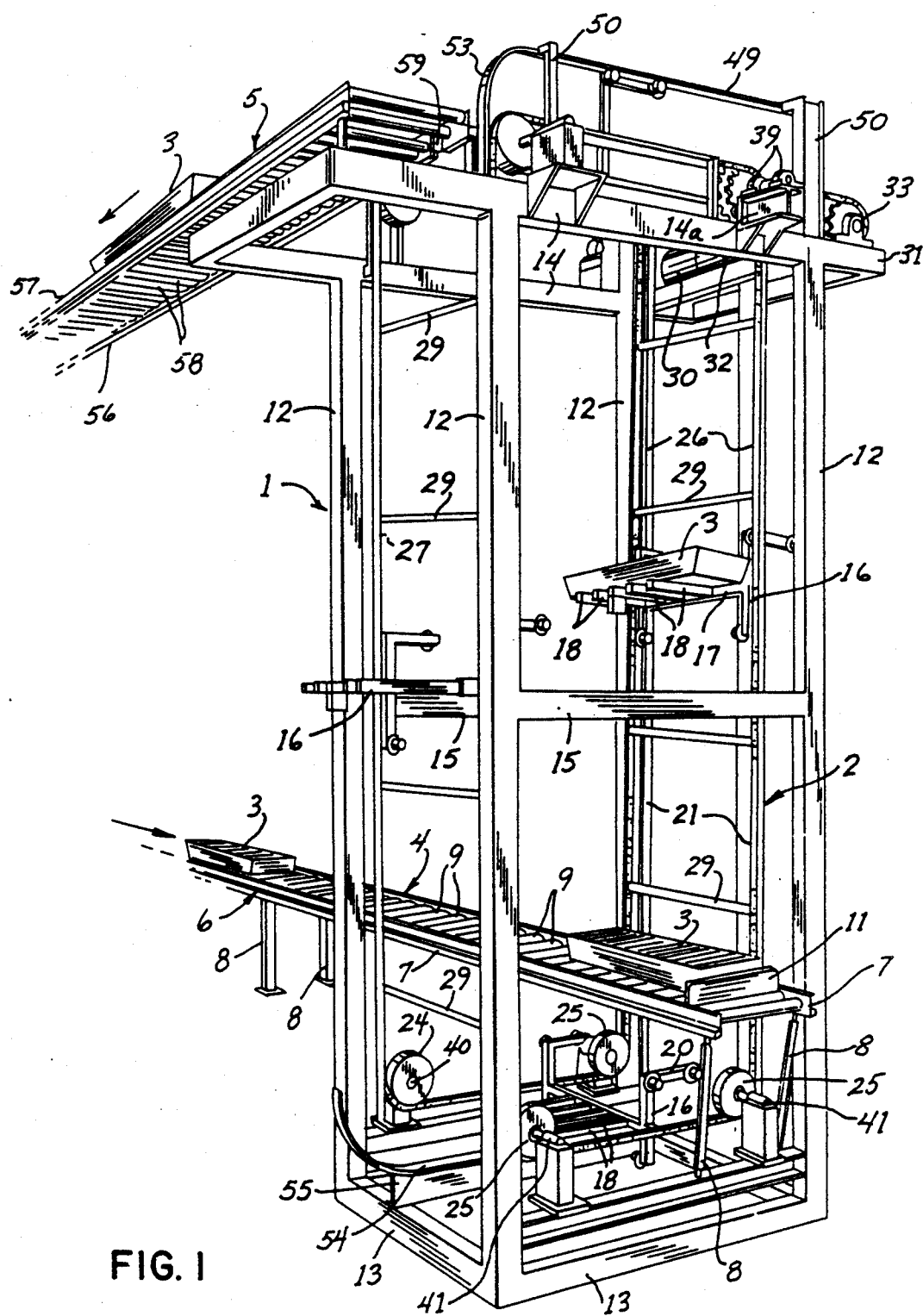
FIG. 1 is a perspective view of the apparatus of the invention.

The infeed conveyor 4 extends within the frame 1 and includes a supporting framework 6 including a pair of side channels 7 that are mounted on legs 8, and as best shown in FIG. 1, are inclined downwardly in a direction toward the transfer unit 2. A plurality of rollers 9 are journaled between the channels 7 and the articles 3 will roll downwardly along the rollers 9 to a location within the frame structure 1.

Figure 5:
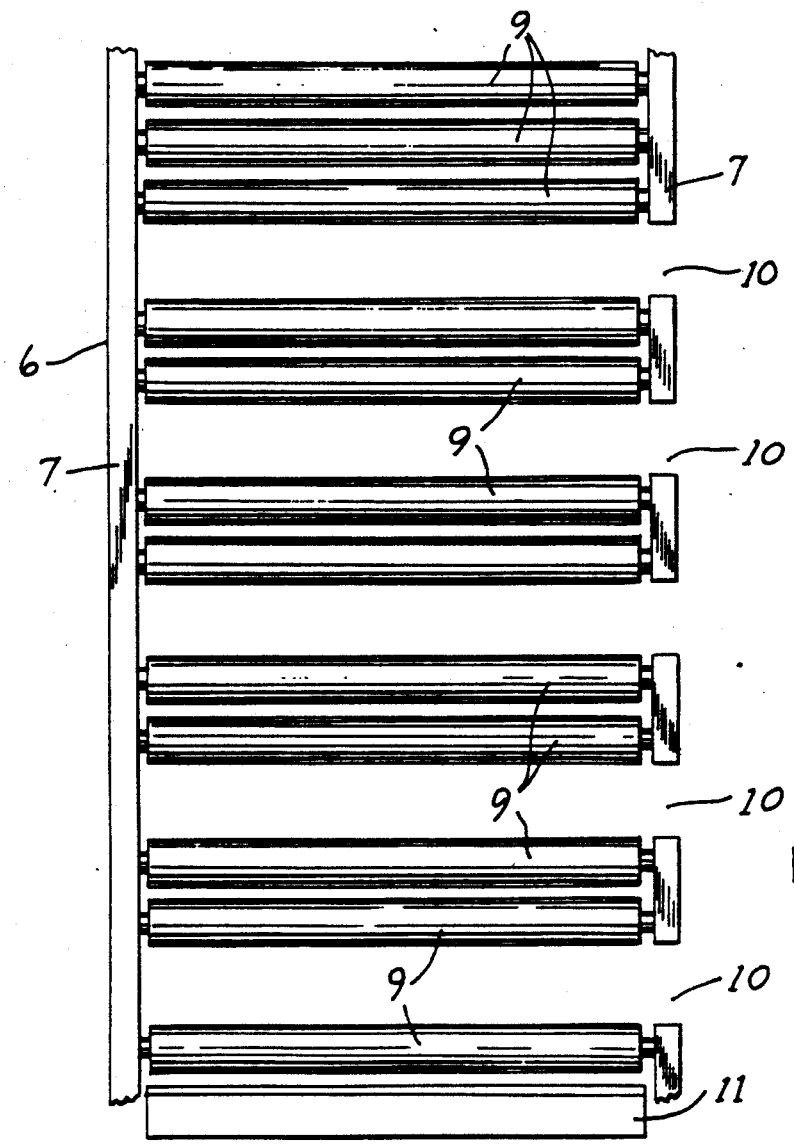
FIG. 5 is an enlarged fragmentary view of the infeed conveyor.

As shown in FIG. 5, one of the side channels 7 is provided with a series of spaced interruptions or gaps 10 which enable the articles 3 to be lifted from the conveyor 4, as will be hereinafter described.

An angle shaped stop bar 11 extends transversely across the conveyor 4 and serves to stop the articles 3 being fed downwardly along the conveyor at a predetermined location within the frame 1.

Frame 1 includes a plurality of vertical columns 12 which are located at the corners of the frame. The lower ends of vertical columns 12 are connected together by horizontal beams 13 while the upper ends of the columns 12 are connected by upper horizontal beams 14. In addition, each pair of columns 12 is connected at their vertical midpoints by beams 15.

The transfer unit 2 includes a plurality or carriers 16 which are mounted for travel in a generally rectangular path within frame 1. Each carrier 16 includes a horizontal bar 17 and a plurality of parallel spaced fingers 18 extend outwardly from bar 17 and serve as a support surface to support the article 3. A vertical bar 19 extends upwardly from each end from horizontal bar 17, and an upper horizontal bar 20 extends from the upper end of each vertical bar 19 is a direction opposite fingers 18.

Carriers 16 are moved in a generally rectangular path by a pair of endless members or chains 21 which are mounted for travel in parallel generally rectangular paths composed of a first vertical run, in upper horizontal run, a second vertical run and a lower horizontal run. The ends of bar 17 are journalled on aligned pins of chains 21 so that the carrier can freely rotate about a horizontal axis.

Each chain is engaged with a drive sprocket 22 and extends around an upper guide wheel 23 as well as around lower guide wheels 24 and 25.

Chains 21 are guided for vertical movement at one end of the frame 1 by a pair of spaced angle shaped guides 26, and similarly the opposite vertical runs of the chains 21 are guided in angle shaped guides 27 located at the opposite end of the frame, Guides 26 and 27 are connected to supporting structure 1 through suitable brackets.

To facilitate movement of the chains in the guides 26 and 27 the inner surfaces of the angle-shaped guides can be lined with strips of a material having a low coefficient of friction, such as nylon, not shown.

In addition, a plurality of spacer rods 29 extend horizontally between corresponding portions or the chains 21 and prevent the chains from moving inwardly toward each other during their travel.

The chains 21 are driven by a motor 30 mounted on a platform 31 that is offset from the upper end of frame 1. The drive shaft of motor 30 operates through a gear box 32 to drive shaft 33 which extends between opposite ends of the frame. Shaft 33 is journaled for rotation in a group of bearings 34 which are mounted on platform 31.

Figure 3:
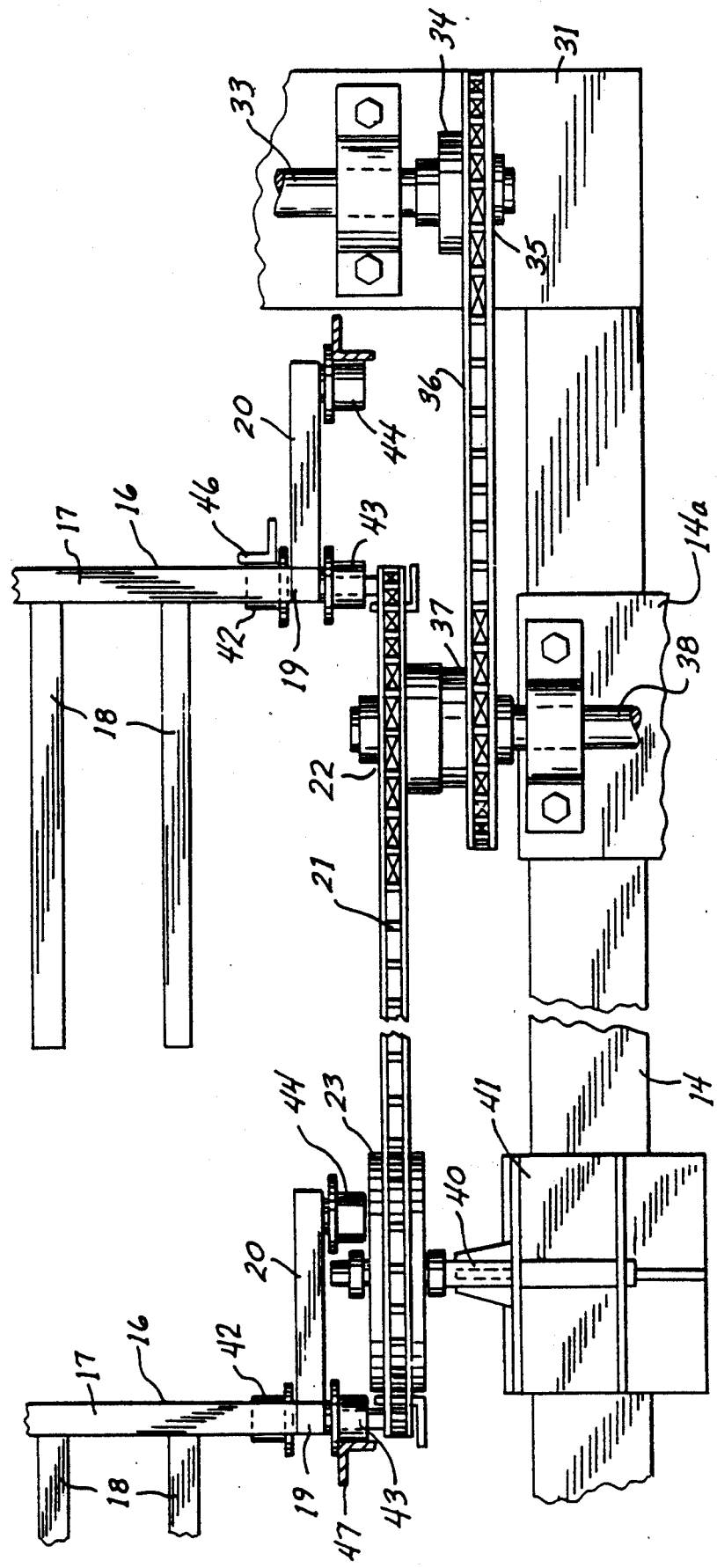
FIG. 3 is a fragmentary horizontal section taken along line 3—3 of FIG. 2.
Figure 4:
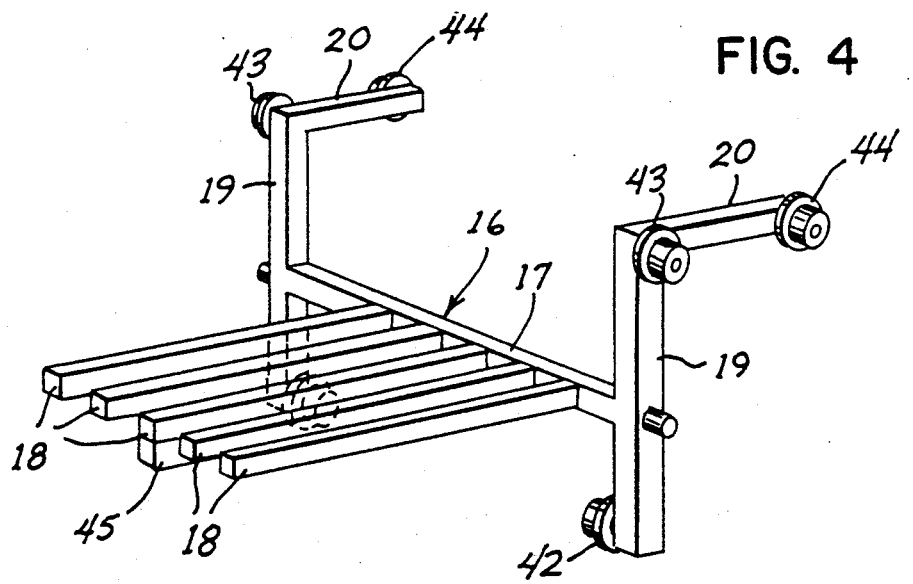
FIG. 4 is a perspective view of a carrier.

As shown in FIG. 3, the ends of shaft 34 carry sprockets 35 and each sprocket 35 is connected by a chain 36 to a sprocket 37 secured to shaft 38. Each shaft 38 is journaled for rotation in bearings 39 which are mounted on the upper beam extension 14a. Each shaft 38 carries the respective drive sprocket 22. With this construction, operation of motor 30 acts to drive the sprockets 22 to thereby move the chains 21 in their respective paths of travel.

The guide wheels 23, 24 and 25 for each chain 21 are mounted n a shaft 40 which is journaled within a bearing 41 mounted on the beams 13 and 14 of frame 1.

As the chains 21 are driven in their endless generally rectangular path of travel, carriers 16 correspondingly move in a rectangular path of travel. To maintain the fingers 18 in a horizontal attitude as the carriers move in the path of travel, a plurality of guide members or rollers are mounted on each carrier 16. More specifically, a roller 42 is journaled on the lower end of each vertical bar 19 and faces inwardly of the carrier toward fingers 18, while a pair of rollers 43 and 44 are journaled on the ends of each horizontal bar 20 and face outwardly of the carrier 16. In addition, a guide block 45 made of nylon or the like, is secured to the lower surface of the outer end of one of the fingers 18 and projects downwardly from the finger.

Figure 2:
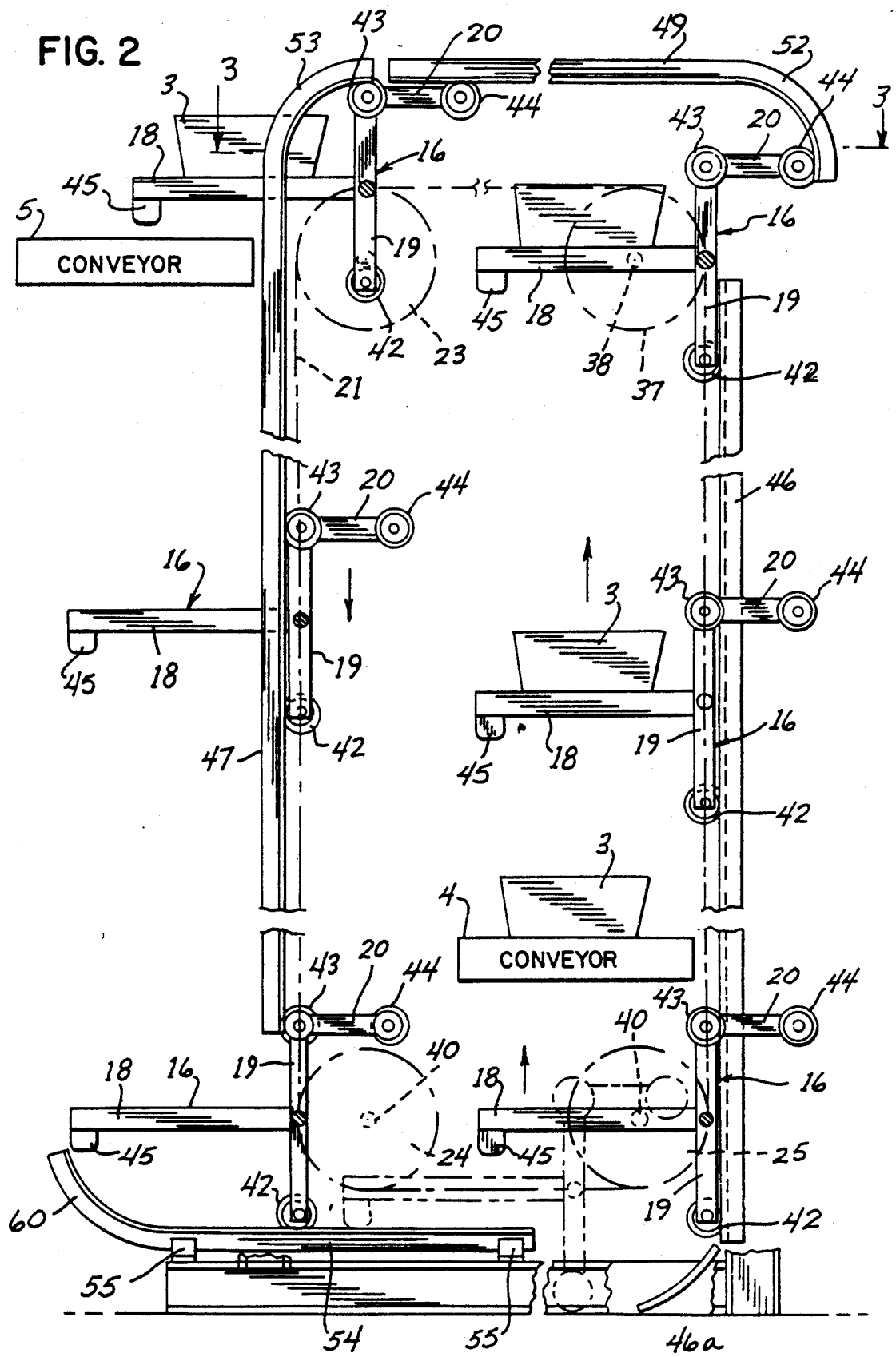
FIG. 2 is a side elevation of the apparatus shown in FIG. 1.

Guides 42-45 are designed to ride against fixed guide tracks on frame 1 as the carrier 16 moves in its path of travel. As best shown in FIGS. 2 and 3, a pair of vertical, angle-shaped guide tracks 46 are mounted in spaced relation at one end of the supporting structure while a pair of similar vertical guide tracks 47 are mounted at the opposite end of the structure. Guide tracks 46 and 47 are connected to frame 1 through suitable brackets.

A pair of upper guide tracks 49 are mounted through bracket 50 to frame 1 and each includes a lower curved end 52 which is offset from the upper end of the respective vertical guide track 46. A pair of second upper curved guide tracks 53 extend upwardly from the upper ends of the respective vertical guide track 47, as shown in FIG. 2. At the lower end of frame 1, a single guide track 54 having an upwardly curved outer end is mounted through brackets 55 to the frame, and track 54 is positioned to be engaged by guide block 45 on finger 18 of carrier 16 as the carrier travels in its lower horizontal run. Guide tracks 47 are mounted in position to be contacted by rollers 42 as carrier 16 travels in a first vertical run, while rollers 44 with ride against tracks 49 as the carrier moves in an upper horizontal run. As the carrier travels downwardly in its second vertical run, rollers 43 will ride on tracks 46, and as the carrier approaches its lower horizontal run rollers 43 will ride on the lower curved end 46a of tracks 46 until guide block 45 engages guide track 54. Thus, the engagement of guides 42-45 with the guide tracks will maintain the supporting fingers 18 of carrier 16 in a horizontal attitude at all times during the travel of the carrier.

Discharge conveyor 5 is located at a higher level than feed conveyor 4 and extends outwardly from the upper end of supporting structure 1 in the path of travel of the carriers 16 so that the carriers can lower the articles onto the discharge conveyor. Discharge conveyor 5 is constructed similar to conveyor 4 and includes a framework 56 which is connected to frame 1. Framework 56 supports a pair of spaced parallel channels 57 and a series of rollers 58 are journaled between the channels and act to support the article 3 in discharge. As in the case of feed conveyor 4, one of the channels 57 is provided with gaps 59 which permit the fingers 18 of carriers 16 to pass through the discharge conveyor.

In operation, the articles 3 are fed to track transfer unit 2 on feed conveyor 4. As the conveyor 4 is inclined downwardly, the articles will move by gravity along the conveyor and be stopped in position by engagement with the stop bar 11.

Through operation of motor 30, each carrier 16 will move in a generally rectangular path of travel and as a carrier moves upwardly in a vertical run, fingers 18 of the carrier will pass through the gaps 10 in feed conveyor 4 and lift the article 3 from the conveyor. As previously noted, the carrier 16 is mounted for free rotation between chains 21 and as the carrier 16 moves upwardly in the vertical run, engagement of the rollers 42 with the guide tracks 46, in cooperation with engagement of chains 21 with guides 26, will prevent tilting of the carrier and maintain the fingers 18 in a generally horizontal attitude When the carrier approaches the upper end of the vertical run, the rollers 44 will move along into engagement with the curved portions 52 of guide tracks 49 and at this time, the rollers 42 move out of engagement with guide tracks 46. As the carrier 16 travels in its upper horizontal run, rollers 44 will engage the straight sections of upper guide tracks 49.

At the end of the upper horizontal run, the carrier 16 will then move downwardly in a vertical run and the rollers 44 will follow the curved portions 53 of the guide tracks as the carrier moves into the vertical run. As the carrier moves downwardly, the rollers 43 will ride against the vertical guide tracks 47 and in combination with the engagement of chains 21 with guides 27 will thereby maintain the fingers 18 in a horizontal attitude. As the carrier continues its downward movement, the fingers 18 will move downwardly through the gaps 54 in the discharge conveyor 5, thereby depositing the article 3 on the discharge conveyor. As previously noted, the discharge conveyor 5 can be mounted at an angle, so that the article will travel downwardly by gravity on the discharge conveyor to a discharge side.

When carrier 16 approaches the lower end of the vertical run, the guide block 45 will engage the outer curved end 60 of lower track 54 and will act to maintain the fingers 18 of the carrier in a horizontal attitude as the carrier travels in the lower horizontal run.

The fingers 18 of carrier 16, which define the supporting surface for the article 3, are cantilevered from the shaft 17 and the engagement of the guide members 42-45 with the guide tracks will maintain the fingers in a horizontal attitude regardless of the weight of the articles 3, or the position or distribution of the load on the fingers.

The guide tracks which are engaged by the guides 42-45 are fixed to the supporting structure or frame and are separate from the chains 21, so that with a heavy load there is no tendency to deflect the chains.

Figure 6:
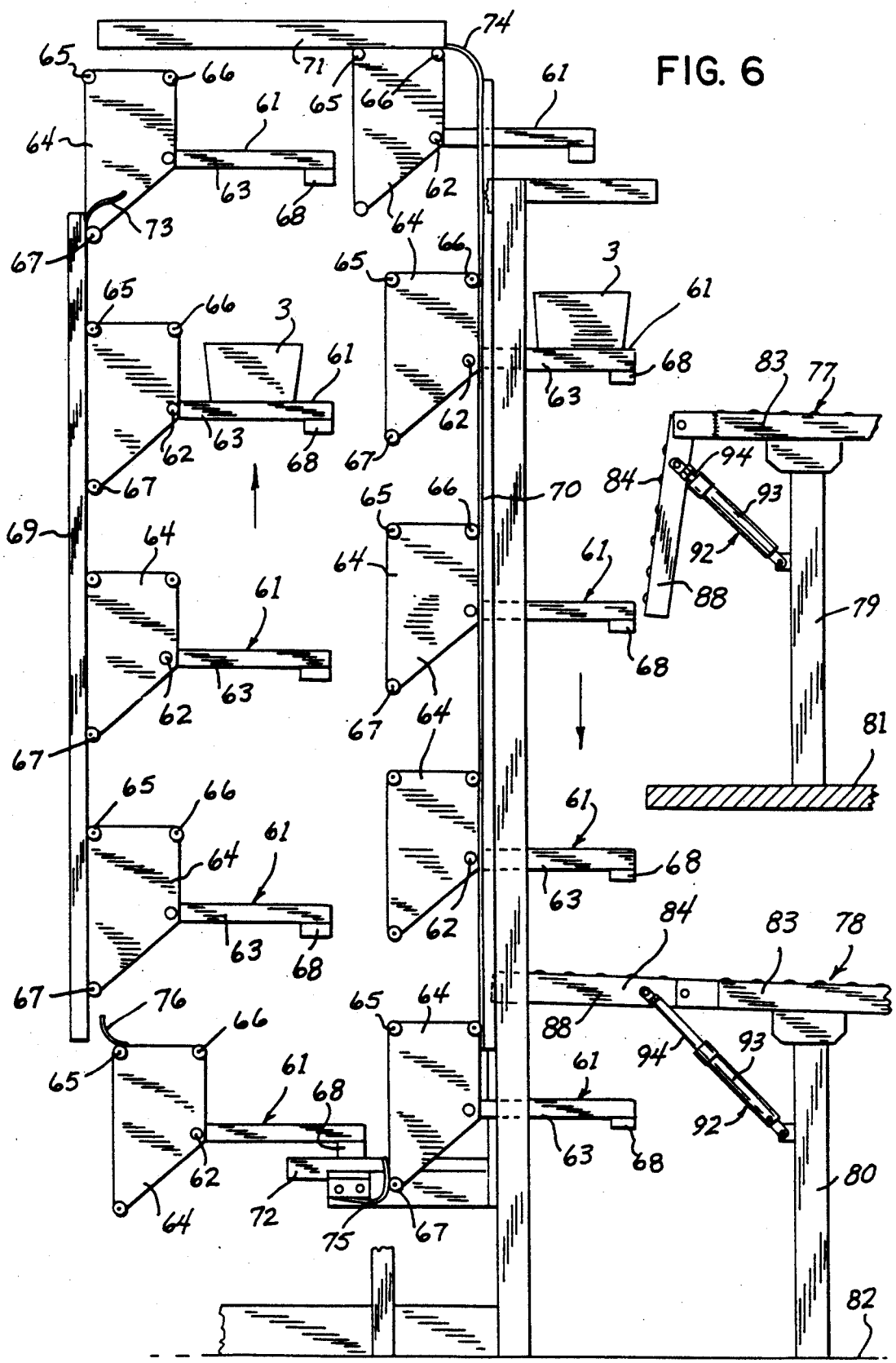
FIG. 6 is a schematic representation of a modified form of the invention.
Figure 7:
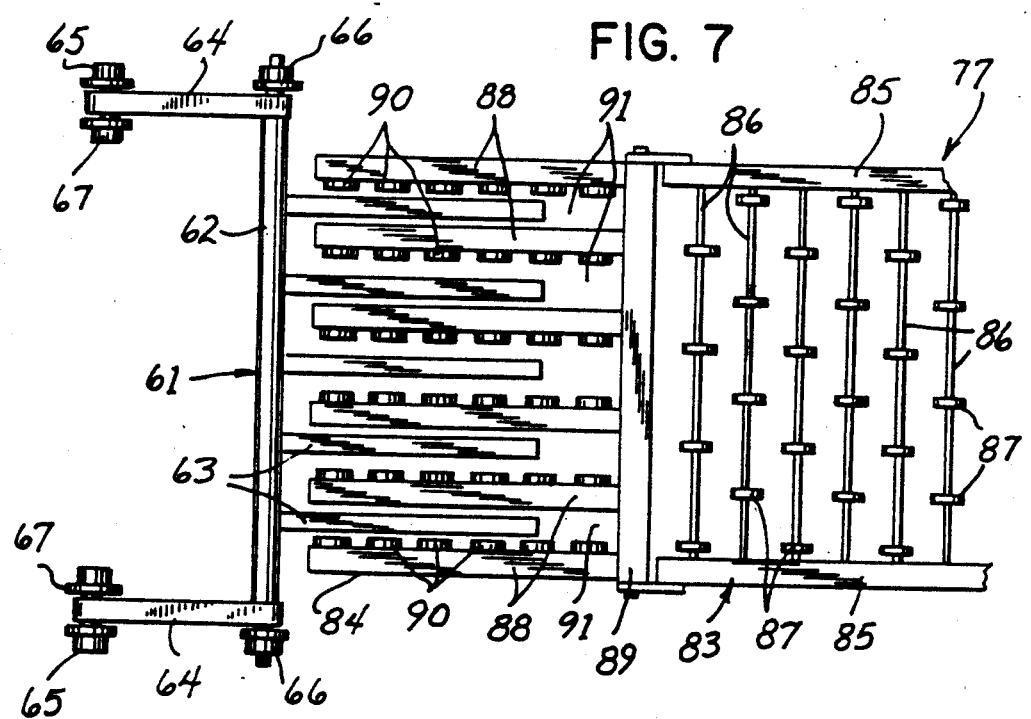
FIG. 7 is a fragmentary plan view of the discharge conveyor.
Figure 8:
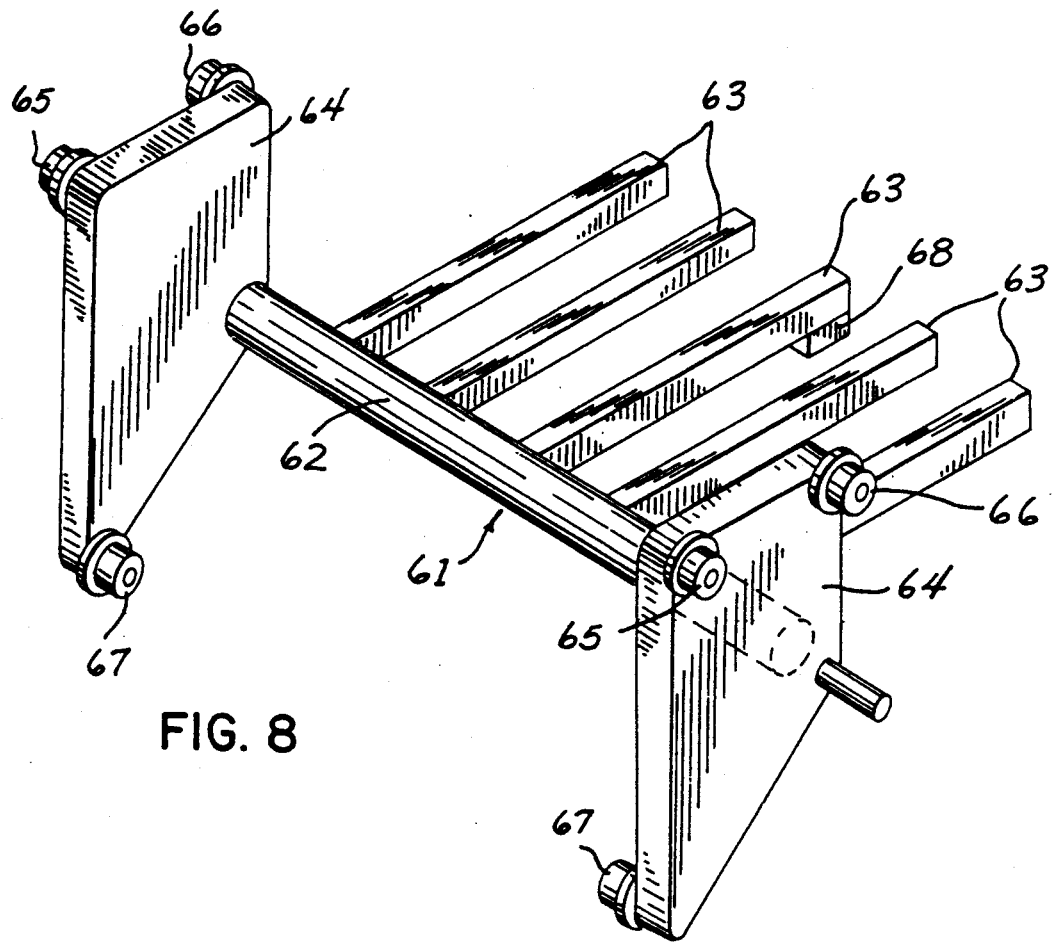
FIG. 8 is a perspective view of a carrier as used in the apparatus of FIG. 6.

FIGS. 6-8 show, in schematic form, a modified form of the apparatus in which a plurality of carriers 61, similar to carriers 16 of the first embodiment, travel in a generally rectangular path of travel, including a first vertical run, an upper horizontal run, a second vertical run, and a lower horizontal run. Each carrier 61 is connected to a pair of drive chains in the manner previously described.

Each carrier 61 includes a support member or bar 62, the ends of which are journalled on the drive chains, as in the manner previously described. A plurality of parallel fingers 63 extend outwardly from each bar 62 and constitute a cantilevered support surface to support an article 3.

As best shown in FIG. 8, a plate 64 is mounted on each end of bar 62 and each plate carries a group of rollers 65, 66 and 67. As shown in the drawings, rollers 65 and 66 are journalled on the upper end of the plate and extend outwardly from the plate, while roller 67 is mounted for rotation on the lower end of each plate and extends inwardly of the carrier.

As in the case of the first embodiment, a pad 68, made of nylon, or the like, is secured to the outer end of one of the fingers 63 and projects downwardly.

To guide the carriers 61 in their rectangular path of travel, a pair of vertical guide rails 69 and 70 are mounted at each end of the frame, while a pair of top rails 71 and 72 are located at the upper and lower ends, respectively, of the frame. In addition, curved corner guides are located at the corners of the path of travel. More particularly, curved guide 73 extends upwardly and inwardly from the upper end of each guide rail 69, while corner guide 74 serves to connect the end of upper guide rail 71 with the upper end of vertical guide rail 70. Curved guide 75 is mounted to each lower guide rail 72, while curved guides 76 are mounted on the frame adjacent the lower ends of the vertical guide rails 69.

As shown schematically in FIG. 6, as the carrier 61 moves upwardly in its first vertical run, the rollers 67 will engage the vertical guide rails 69 and the drive chains will engage the chain guides, as previously described, to maintain the fingers 63 in a horizontal attitude. As the carrier 61 reaches the upper end of the vertical run, the rollers 67 will move along the curved corner guides 73 and the upper roller 65 will then engage the upper guide 71 to again maintain the fingers in a horizontal position, as the carrier moves in its upper horizontal run.

As the carrier approaches the downstream end of the upper horizontal run, the rollers 66 will engage the curved corner guide 74 and the rollers 66 will then move onto the vertical guide rail 70 and the drive chains will engage the chain guides to maintain the fingers 63 in a horizontal position as the carrier moves in its downward vertical run.

When approaching the lower end of guide rails 70, the rollers 67 will engage the curved guide 75 to guide the carrier around the corner, and the pad 68 will then engage the lower horizontal guide rail 72 to maintain the carrier in a horizontal attitude as it moves in its lower horizontal run. As the carrier approaches the end of its lower horizontal run, the roller 65 will engage the curved corner guides 76, which guides the carrier around the corner and the rollers 65 will then engage the vertical guide rails 69 to complete the path of travel.

The carrier 61 has an advantage over the weldment as shown in the first embodiment, for a group or batch of plates 64 can be cut and holes drilled to receive the rollers, thus providing more precise positioning for the guide rollers and eliminating the welding operations.

In the embodiment of FIGS. 6-8, an article 3 is picked up on the carrier 61, as the carrier moves in its first vertical run, and the article is then deposited on a second conveyor as it moves downwardly in the second vertical run. The feeding of the articles to the carriers is not illustrated in FIGS. 6-8 and can take the same form as that previously described with respect to FIGS. 1-5. However, FIGS. 6-8 illustrate a modified form of discharge of the articles 3. In this connection, a pair of vertically spaced discharge conveyors 77 and 78 are mounted alongside the downwardly path of travel of the carriers 1 and each conveyor 77,78 is supported through a support structure 79 and 80, respectively, from a floor or foundation 81,82. In practice, the two floors 81 and 82 can constitute different floors of a building, or can constitute a main floor and a mezzanine.

Each conveyor 77,78 includes a main conveyor section 83 and a pivotable end section 84, which is mounted for pivoting movement with respect to the main section 83 from an operating position, where it forms an extension to conveyor section 83, and a downwardly hanging inoperative or pendant position.

Each main conveyor section 83 includes a pair of side rails 85 which are interconnected by shafts 86 and a plurality of wheels or rollers 87 are mounted on each shaft in staggered or offset relation.

Each end conveyor section 84 is formed with a series of generally parallel spaced fingers 88, which are connected to an end bar 89 that is pivoted to the side rails of section 83. Rollers 90 are mounted for rotation on each finger 88 and the rollers are spaced sufficiently from the next adjacent finger to provide gaps 91 through which the fingers 63 of the carrier 61 can pass.

To move each conveyor section 84 between the operating and inoperative positions, a cylinder unit 92 is employed. Cylinder unit 92 includes a fluid cylinder 93, such as a pneumatic or hydraulic cylinder, which is pivotally connected to the supports 79,80 and the piston rod 94 of cylinder 93 is pivotally connected to the respective section 84. By extending the piston rods 94, the sections 84 can be pivoted to the horizontal or extended position. Conversely by retracting the piston rods, the sections will be pivoted downwardly to the inoperative or pendant position.

By selectively moving either conveyor section 84 to its extended position, the articles 3 being carried by the carriers 61 will be deposited on the extended section 84, as the carrier moves in its downward path of travel. As the conveyors 77 and 78 are slightly inclined, the articles deposited on the conveyors will travel downwardly by gravity to a discharge site. Alternately, the conveyors 77 and 78 can be power operated. With this construction, articles can be selectively delivered to various levels of a building.

As the carriers 16,61 are cantilevered, they provide three-sided access for feeding and delivery. More specifically, FIGS. 1-5 show a system in which the discharge of the articles is perpendicular to the cantilivered fingers of the carrier 16, while FIGS. 6-8 show a system in which the discharge is parallel to the cantilivered fingers of the carrier. Thus, the apparatus of the invention provides great versatility in the feeding and delivery of articles from the system.

While the invention can be used to elevate articles from a lower level to an upper level, it can also be employed to lower articles or to move articles upwardly, then horizontally over an obstruction and then downwardly to a discharge site. Further, while the drawings have shown the carriers 16 moving in a generally rectangular path, it is contemplated that the path of movement can take various configurations, with the carriers moving horizontally, vertically, or at an angle to the horizontal or vertical.

Similarly, other endless drive members, can be substituted for chains 21 to drive the carriers 16,61 and other types of guides can be substituted for the rollers 42-44 and 65-67.

Various modes of carrying out the invention are contemplated as being within the scope of the following claims particularly pointing out and distinctly claiming the subject matter which is regarded as the invention.

I claim:

1. A material transfer apparatus, comprising a supporting structure, a pair of flexible drive members mounted to move in parallel paths of travel, at least one carrier having a supporting surface to support an article to be transferred, means for journalling opposed ends of the carrier on said drive members for free rotation about a horizontal axis, said supporting surface being cantilevered outwardly from said axis, operating means for driving the drive members and corresponding moving said carrier in a path of movement including a generally upward run and a generally downward run, guide means on the supporting structure and disposed to be engaged by the carrier as the carrier moves in its path of movement, said guide means being constructed and arranged to maintain the supporting surface in a generally horizontal attitude as said carrier moves in said path of movement, feeding means for feeding an article onto said supporting surface as said carrier moves in the upward run, discharge means for discharging the article from the supporting surface as the carrier moves in the downward run, said discharge means comprising a pair of discharge conveyors disposed at different vertical levels, said discharge conveyor comprising a main conveyor section and a second conveyor section pivotally connected to said main section, each second conveyor section being movable from a first position where it is disposed in the path of travel of said carrier as the carrier moves in said downward run to a second position where said second conveyor section is out of said path of travel, and means for selectively moving each second conveyor section from the first to the second position.

2. A material transfer apparatus, comprising a supporting structure, a pair of flexible drive members mounted to move in parallel paths of travel, at least one carrier having a supporting surface to support an article to be transferred, means for journalling opposed ends of the carrier on said drive members for free rotation about a horizontal axis, said supporting surface being cantilevered outwardly from said axis, operating means for driving the drive members and corresponding moving said carrier in a path of movement including a generally upward run and a generally downward run, guide means on the supporting structure and disposed to be engaged by the carrier as the carrier moves in its path of movement, said guide means being constructed and arranged to maintain the supporting surface in a generally horizontal attitude as said carrier moves in said path of movement, feeding means for feeding an article onto said supporting surface as said carrier moves in the upward run, discharge means for discharging the article from the supporting surface as the carrier moves in the downward run, said discharge means comprising a pair of conveyors disposed at different vertical levels, each conveyor comprising a main conveyor section and a second conveyor section mounted for pivotal movement with respect to said main section from an operative position where said second section forms an extension to said main section and a generally pendant position, said second sections when in the operative position being disposed in the path of travel of said carrier as it moves in its downward run whereby said article will be deposited on said extended second section.

3. A material transfer apparatus, comprising a supporting structure, a pair of flexible drive members mounted to move in parallel paths of travel, at least one carrier having a supporting surface to support an article to be transferred, journaling means for journaling opposed ends of the carrier on said drive members for free rotation about a horizontal axis, said supporting surface being cantilevered outwardly from said axis, operating means for driving the drive members and correspondingly moving said carrier in a path of movement, a first guide member on the carriage and vertically offset from said horizontal axis, first guide means on the supporting structure and disposed to be engaged by said guide member as said carriage moves in said path of movement, and second guide means on the supporting structure and disposed to be engaged by the portions of said flexible drive members engaged with said journaling means as said carrier moves in said path of movement, said second guide means being parallel to and offset from said first guide means, the engagement of said first guide member with said first guide means and the simultaneous engagement of said flexible drive member with said second guide means maintaining the supporting surface in a generally horizontal attitude as the carrier moves in a generally vertical portion of said path of movement.

4. The apparatus of claim 3, wherein said flexible drive members are chains.

5. The apparatus of claim 3, wherein said second guide means also includes a guide surface disposed laterally of each flexible member and disposed to prevent lateral displacement of said flexible member.

6. The apparatus of claim 3, wherein said carrier is disposed to move in a generally rectangular path of movement, including an upper vertical run, an upper horizontal run, a downward vertical run and a lower horizontal run.

7. The apparatus of claim 6, and including a plurality of first guide members mounted on the carriage with each first guide member being offset from said axis, each guide member being constructed and arranged to engage said first guide means as said carriage is moved in the respective upward vertical run, the upper horizontal run, the downward vertical run and the lower horizontal run, only one of said first guide members being engageable with said first guide means at any time during movement of said carrier in said vertical runs.

8. The apparatus of claim 3, wherein said first guide means includes an elongated first guide track and said first guide member comprises a roller disposed to ride on said first guide track, and said second guide means comprises a second elongated guide track.

* * * * *

UNITED STATES PATENT AND TRADEMARK OFFICE
CERTIFICATE OF CORRECTION

PATENT NO. : 4,987,992

DATED : January 29, 1991

INVENTOR(S) : ROBERT H. PFLEGER

It is certified that error appears in the above-identified patent and that said Letters Patent is hereby corrected as shown below:

Col. 8, Line 17, CLAIM 1  Delete "said" and substitute therefor --each--

Signed and Sealed this

Twenty-first Day of July, 1992

Attest:

DOUGLAS B. COMER

Attesting Officer   Acting Commissioner of Patents and Trademarks